May 12, 1936. O. M. DEAN 2,040,364
PROCESS OF CUTTING FUR
Filed Dec. 18, 1935 3 Sheets-Sheet 1
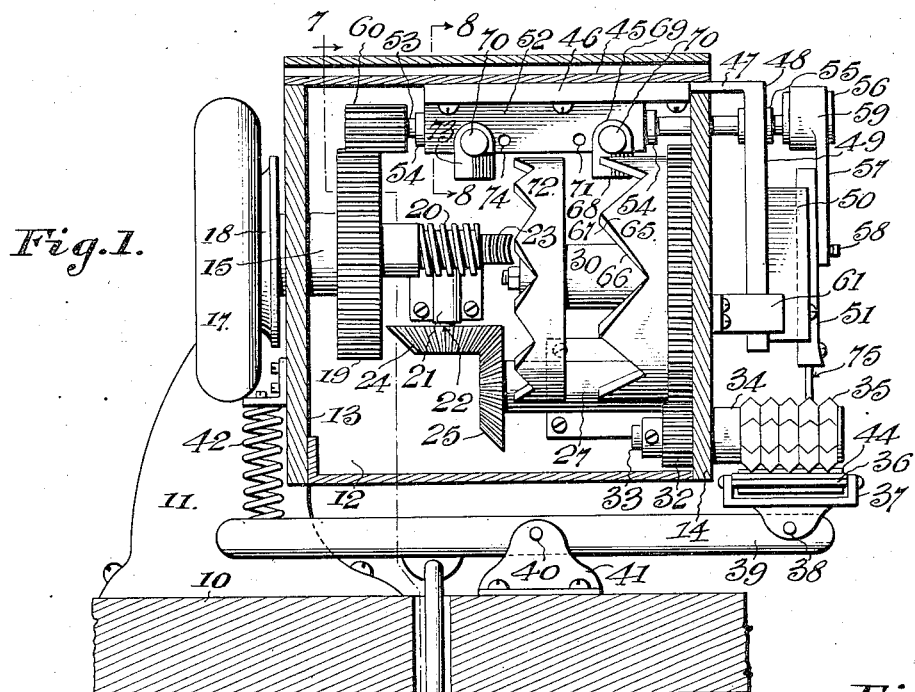
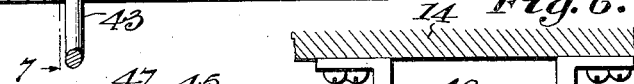
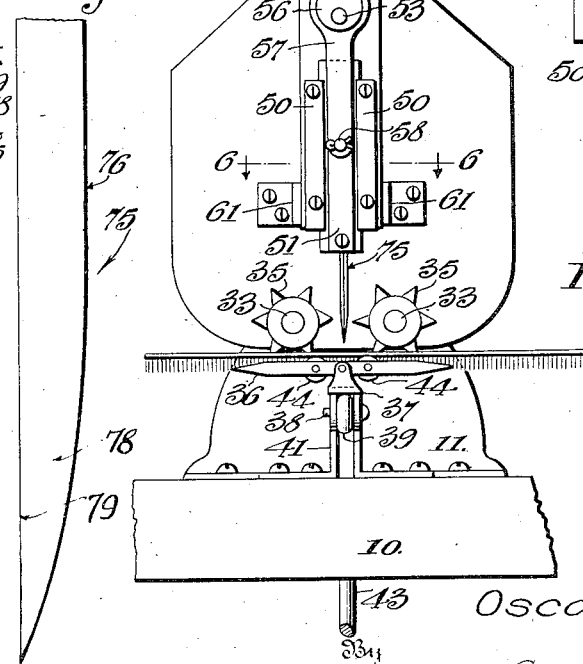
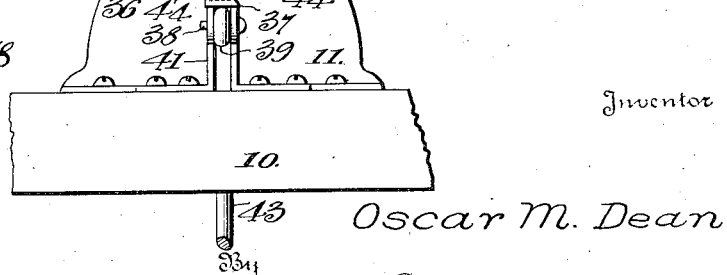
Inventor
Oscar M. Dean May 12, 1936.  O. M. DEAN  2,040,364
PROCESS OF CUTTING FUR
Filed Dec. 18, 1935   3 Sheets—Sheet 2
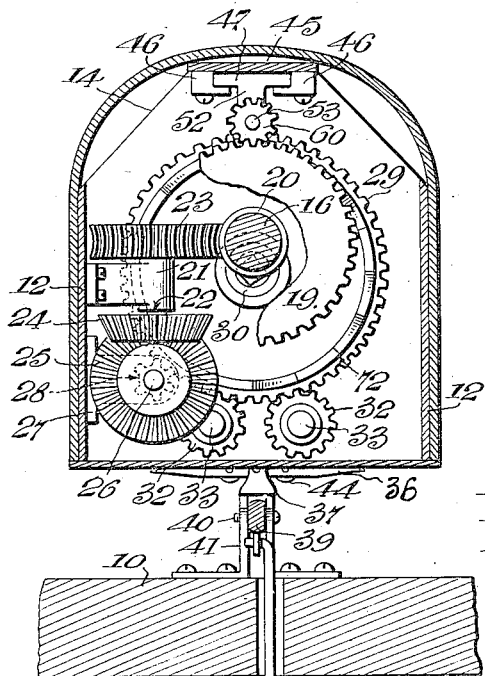
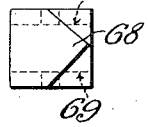
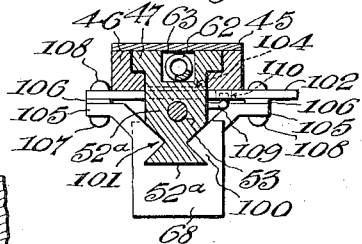
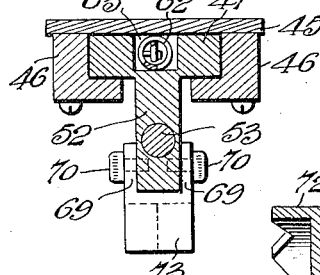
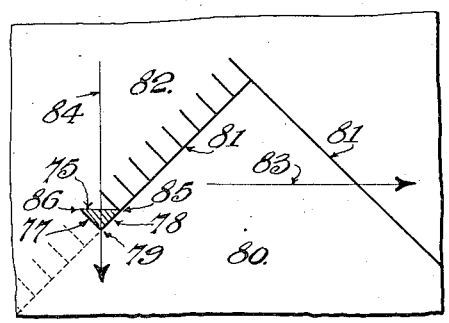
Inventor
Oscar M. Dean May 12, 1936.  O. M. DEAN  2,040,364
PROCESS OF CUTTING FUR
Filed Dec. 18, 1935  3 Sheets-Sheet 3
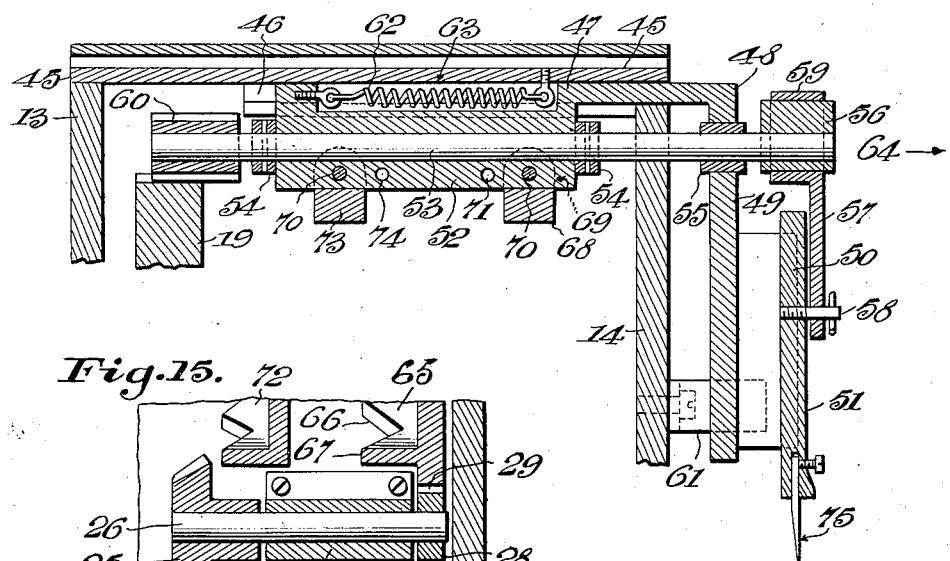
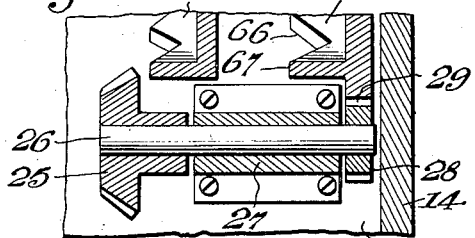
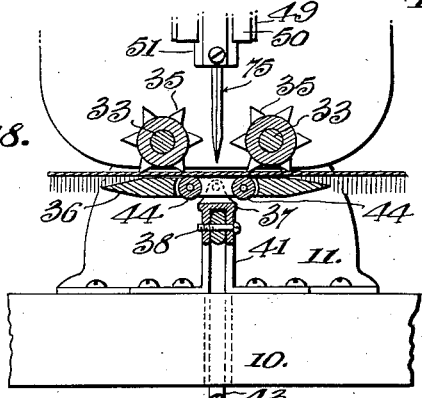
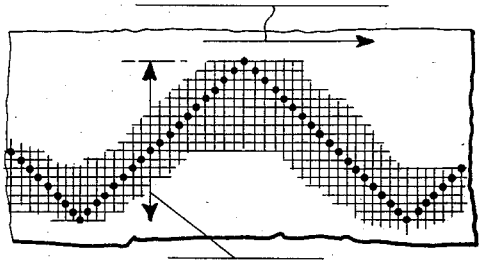
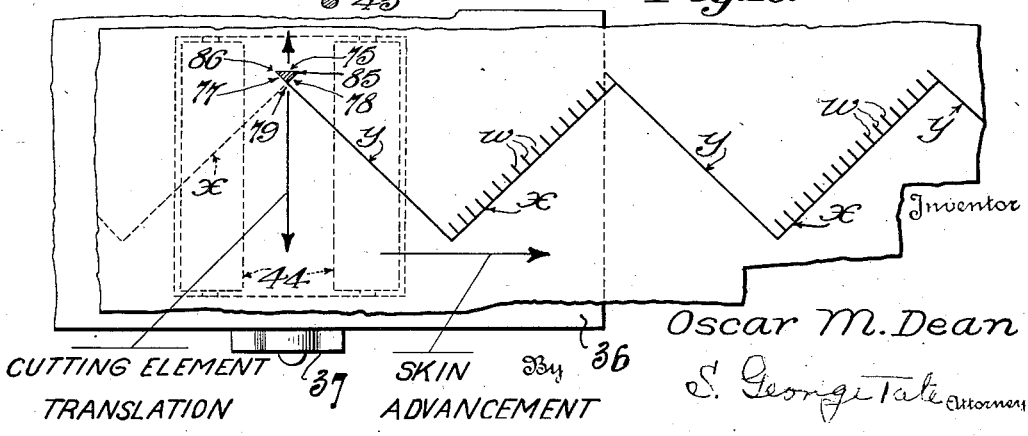

Patented May 12, 1936

2,040,364

UNITED STATES PATENT OFFICE 2,040,364

PROCESS OF CUTTING FUR

Oscar M. Dean, Sioux City, Iowa

Application December 18, 1935, Serial No. 55,130

15 Claims. (Cl. 164—50)

My invention relates to the art of notching the edges of furs which are to be sewed together. It has been learned in the fur garment industry that the line of stitching between two skins may be fairly well concealed by providing the edges of the skins with registering notches and sewing the skins together along the edges of these notches. The notches are tri-angular in shape and preferably formed with edges disposed at 90° to each other.

The object of the present invention is to provide a new and improved method or process of cutting fur by practice of which these notches can be rapidly and very accurately cut in the furs. At the present time it is considered necessary to cut these notches by hand, and furriers have acquired considerable skill in the use of a fur knife. The inaccuracy, however, which is characteristic of the human hand, makes it practically impossible ever to obtain a perfect match in the notches of skins thus cut, when sewed together. By practice of my improved method it is possible to form zig-zag or notched-line cuts which enable perfect matching of the notches of skins thus cut, when sewed together, and the method is such that it is readily adaptable to practice in various forms of commercial machines, an example of which is disclosed herein in support of the detailed description of said method.

The most important requirement in notching furs, next to the accuracy of the notches, is that the cutting shall be done without clipping any of the hairs of the fur. It can be readily seen, if scissors or any sort of shearing device were to be used, that the hairs which lie over the line of cut would be clipped and shortened. When the furs were sewed together, these shortened hairs would very definitely mark the seam between the skins. This has been avoided in the past by the skill of the hand operator in cutting the fur from the side opposite the hairs. However, it constitutes a real problem when the cutting of the furs by machinery is contemplated. This problem has undoubtedly been the obstacle which has so far stood in the path of the machine cutting of furs.

My invention overcomes this problem by a novel utilization of a reciprocating slender cutting element which passes through or pierces the skin at right angles to the surface thereof and cuts a very short portion of the line of cut during a single piercing operation. This is the basic feature of my invention.

Another object of my invention is to provide an improved method or process of cutting fur in which the notching effect is obtained by a combined translatory movement of the cutting element in a direction at right angles to its axis of reciprocation and the movement of the skin in a direction at right angles both to the direction of reciprocation of the cutting element and the direction of translatory movement of the cutting element.

Another object of my invention is to provide an improved method or process of cutting fur in which the slender cutting element utilized repeatedly pierces or passes through the hide from the flesh side entering between and deflecting but not cutting the hairs, and in which the hide and the cutting element are shifted relatively to form the desired zig-zag or notched-line cut each zig and zag of which is formed by a succession of relatively narrow individual cuts conjointly forming the continuous line cut.

With these and other objects in view, my invention consists in the novel step or act or series and combination of steps or acts of fur cutting hereinafter more fully set forth in the following detailed description, and particularly pointed out in the appended claims, reference being had to the accompanying drawings, in which:

Figure 1 is a longitudinal, sectional view through an example of a machine capable of practicing my invention, Figure 2 is a front elevation of the machine, Figure 3 is an inverted, plan view of the cutting element, Figure 4 is a front elevation of the same, Figure 5 is a right, side elevation of the same, Figure 6 is a horizontal, sectional view taken on the line 6—6 of Fig. 2, Figure 7 is a vertical, sectional view taken on the line 7—7 of Fig. 1, Figure 8 is a detail, sectional view taken on the line 8—8 of Fig. 1, Figure 9 is a somewhat diagrammatic plan view illustrating a portion of a skin and a portion of a zig-zag or notched-line cut in the process of formation, Figure 10 is a detail, sectional view through the axis of the cams which produce translatory movement of the cutting element, Figure 11 is an inverted, plan view of one of the cam followers, Figure 12 is a plan view of a modified form of the carriage, Figure 13 is a transverse, sectional view taken on the line 13—13 of Fig. 12, Figure 14 is a longitudinal sectional view through the carriage, Figure 15 is a longitudinal sectional view through the transmission shaft assembly, Figure 16 is a diagrammatic plan view illustrating a continuous zig-zag or notched-line cut and the directions of advancement of the skin and translatory movement of the cutting element, Figure 17 is a diagrammatic plan view illustrating the effect of relatively shifting the skin and the cutting element in timed relation, and Figure 18 is a detail vertical cross section of the skin supporting plate and the feed rollers.

The machine which I have disclosed as an example of mechanism capable of performing my improved method comprises a base 10 which supports a bracket 11 on which the cutting head is mounted. The cutting head has a box or frame including the side walls 12, the rear wall 13, and the front wall 14. In a suitable bearing 15 on the rear wall 13 is mounted a shaft 16 at the outer end of which is secured a combined fly-wheel 17 and pulley 18. Within the cutter head frame, a gear 19 is secured to the shaft 16 and a worm 20 is formed on or secured to the end of the shaft.

Journaled in a bearing 21 secured to a side wall 12 is a shaft 22 to the upper end of which is secured a worm wheel 23 meshing with the worm 20. To the lower end of the shaft 22 is secured a bevel gear 24 which meshes with the bevel gear 25, mounted on a transmission shaft 26.

The shaft 26 is journaled in the bearing 27 secured to the side wall 12, and to its other end is secured a pinion 28. See Fig. 15.

The pinion 28 meshes with a spur gear 29 mounted on a sleeve 30, which in turn is journaled on the stud 31 secured in the front wall 14. See Fig. 10.

Two pinions 32 secured to a pair of shafts 33 supported horizontally and in spaced relation in bearings 34 on the front wall 14 mesh with the spur gear 29 for the purpose of having rotation imparted thereto from said gear. To the free ends of the shafts 33 are secured a pair of hide advancing or feed rollers 35.

Co-acting with the rollers 35, is a hide or skin supporting plate 36 mounted in a yoke 37 which is pivoted as at 38 upon a swinging lever 39. The lever 39 is fulcrumed at 40 in a bracket 41 secured to the base 10. A compression spring 42 urges the rear end of the lever downwardly, thus urging the skin supporting plate upwardly toward the feed rollers 35. Upward pressure from a suitable foot lever (not shown) delivered by a push rod 43, serves to effect separation between the plate 36 and the rollers 35 to allow a skin to be inserted therebetween.

Rollers 44 may be mounted in the skin support 36 to facilitate the movement of the skins thereover.

A bridge bar 45 connects the upper ends of the walls 13 and 14, and secured to the bridge bar 45 is a pair of guides 46 which slidably support the horizontal slide member 47 of the carriage 48. The carriage includes a vertical, depending arm 49, to which is secured a pair of guides 50 between which is slidably mounted the cutter element carrier or chuck 51.

The horizontal arm 47 of the carriage has a central depending rib 52, and a cutting element reciprocating shaft 53 extends longitudinally through the rib 52 and has rotative bearing therein. Collars 54 secured to the shaft prevent longitudinal movement of the shaft relative to the carriage. The shaft 53 extends forwardly through the arm 49 and is journaled in a bushing 55 therein. Upon the front end of the shaft is secured an eccentric cam 56. A pitman 57 is pivoted at 58 to the carrier 51 and has a sleeve portion encircling the cam 56.

On the opposite end of the shaft 53 is secured a pinion 60 which meshes with the drive gear 19. The pinion 60 is long enough so that as the carriage moves longitudinally of the machine, the pinion will remain in mesh with the gear 19, the teeth of the pinion sliding relative to the teeth of the gear.

A pair of guides 61 secured to the forward wall 14 retain the lower end of the depending arm 49 of the carriage against lateral movement as the carriage moves longitudinally.

A pull-spring 62 is secured at its rear end to the carriage 47 and at its forward end to the bridge bar 45. The pull-spring 62 lies in a groove 63 in the arm 47 of the carriage. The pull of the spring tends to move the carriage forwardly, in the direction indicated by the arrow 64 in Fig. 14.

In order to move the carriage rearwardly, I provide a crown cam 65, which may be formed as a part of the gear 29 or secured to the sleeve 30, and which rotates in unison with the gear. The notch faces 66 of the teeth 67 of the crown cam engage against a cam follower 68, secured to the rib 52 of the carriage. The follower 68 in horizontal cross-section is tri-angular shaped as shown in Fig. 11. The upper extremity of the follower is formed with a pair of arms 69 (Fig. 8) which embrace the rib 52 and are secured thereto by thumb screws 70 extending therethrough and into the rib 52.

The object of thus securing the follower is to provide for adjustment. It should be understood that the thumb screws are removably receivable in suitable threaded apertures in the rib 52 and by removing these screws and the follower and shifting the follower and applying the screws to similar auxiliary apertures 71 in the rib the follower will be secured in position out of engaging relation with the crown cam 65. An auxiliary crown cam 72, having a greater number of notches than the cam 65, co-acts with an auxiliary follower 73 shaped to fit the cam 72, the follower 73 being shown positioned out of engagement. It may be positioned in engagement with its cam by securing it to the threaded holes 74 in the same manner as the other follower.

The machine is thus selective for two different sizes of notches, since the size of a notch depends upon the relative number of reciprocations of the carriage compared with the speed of travel of the skin. Since the latter is constant, variation of the former will produce a variation in the size of the notch. The small cam is used for Hudson seal and the larger for Northern seal.

The follower blocks may be controlled by a lever as shown in Figs. 12 and 13, wherein the blocks are formed with ears shaped as at 100 in Fig. 13, and slidably mounted in grooves 101 in the depending rib 52—a of the carriage.

A lever 102 is pivoted at 103 in a slot 104 in the rib 52—a, and is connected to a pair of ears 105 on the follower blocks 68 and 73 respectively, by a pair of links 106, pivoted at 107 and 108 to the ears 105 and lever 102 respectively.

A pin 109 mounted in the rib 52—a, engages an opening 110 in the lever 102 to hold the lever in the position shown in Fig. 12, wherein the follower blocks are positioned so that the carriage is actuated by the secondary cam 72.

A pin 111, similar to the pin 109, engages the opening 110 to secure the lever in a reverse position wherein the follower blocks are spread apart to bring the forward follower block into engagement with the primary cam 65. The ends of the pins 109 and 111 are rounded to allow the lever 102 to spring past them.

One form of cutting element adaptable to use in the practice of my improved method or process of fur cutting is shown in detail in Figs. 3, 4 and 5 and is generally designated 75. This cutting element is very slender and resembles a needle in appearance but, unlike a needle, includes cutting edges and is capable of cutting fur. In horizontal cross-section, it is triangular as shown in Fig. 3. The upper or major portion of the rear face of the cutting element is parallel to and adjacent the wall 14 and perfectly straight and vertical as indicated at 76 in Fig. 5. The lower portion of the face 76 curves or slopes forwardly as shown at the lower part of Fig. 5 to intersect the faces 77 and 78 and forms lateral cutting edges 85 and 86.

The two faces, 77 and 78, of the cutting element are equal in area and width and converge forwardly to form a central corner or edge 79 which is perfectly straight and vertical and terminates at its lower end in a penetrating or piercing point flanked at either side by the converging cutting edges 85 and 86.

The faces 77 and 78 are so inclined relative to each other that the angle formed between them, in a horizontal cross-section of the cutting element, is equal to the angle between the sides of the cut to be produced in the work. In other words the faces 77 and 78 bear the same angular relation as do the individual zigs and zags of the zig-zag or notched-line cut. The cutting of portions of a zig and zag which cooperate to form a single notch is shown in Fig. 9, wherein the skin is indicated by the reference character 80, and the edges of the cut by the reference character 81. The waste material which is trimmed from the edge of the skin is indicated at 82.

Assuming that the skin is being fed between the plate 36 and the rollers 35 in the direction indicated by the arrow 83, while the cutting element, shown in cross-section of Fig. 9, is traveling in the direction indicated by the arrow 84, it will be seen that the face 78 of the cutting element will be exactly parallel to the edge of the portion of the cut 81 in process of formation. The smooth edges 81 of the cut result from the cutting effect of the sharp edges 85 and 86, the angular relation which they bear, one to the other, and the constantly timed relative movements of which the skin and the cutting element partake.

In Fig. 16 of the drawings I have illustrated a portion of a continuous zig-zag or notched-line cut and the relative movements of which the skin and the cutting element partake in bringing about the angular relation of the individual zigs and zags. The result of slowly advancing the skin and slowly translating the cutting element back and forth across the path of advancement of the skin in constantly timed relation, is the formation of a continuous zig-zag or notched-line cut, each zig $x$ and each zag $y$ of which is formed by a rapid succession of individual narrow cuts formed by the cutting element as shown in Fig. 9.

In Fig. 17 I have diagrammatically illustrated how the penetrating or piercing point of the cutting element always strikes the desired line of cut. This is made possible because any given unit or distance of skin movement is attended by a like unit or distance of translatory movement of the cutting element and consequently the point of the element will always strike the skin in the desired line of cut as shown by the heavy dots in Fig. 17. The crossed light lines therefore illustrate what might be termed units of movement, of advancing movement with respect to the skin, and of movement of translation with respect to the cutting element.

It will be obvious that a single piercing action or penetration of a skin by the cutting element shown in detail in Figs. 3, 4 and 5 will form a two-sided, three cornered cut as a result of the action of the point forming the terminus of the edge 79 and the cutting edges 85 and 86 which recede upwardly and laterally-angularly therefrom. In practicing the method the parts should be so timed that the individual penetrations of the point, indicated by heavy dots in Fig. 17, are spaced apart less than the width of the respective faces 77 and 78. Thus when the cutting element translatory movement is forward, or during the formation of the zigs $x$ in Fig. 16, the cutting element, at each downward movement will engage and penetrate or pierce a solid or uncut portion of skin and the angular cut formed by the cutting edge 85 will aline with and merge into the previously made cut to form the desired continuous line cut, whereas the angularly disposed cut formed by the companion edge 86 will be superfluous and will extend into the waste portion of the skin as indicated at $w$. It is to be understood that the waste cuts $w$ are exaggerated in this diagrammatic illustration, and in the actual cutting of the skin, when the natural resilience of the skin body will permit a degree of stretch and deflection, these cuts will be hardly noticeable. When the cutting element translatory movement is rearward, however, or during the formation of the zags $y$ in Fig. 16, the cutting element, at each downward movement will enter a previously made cut in the skin and the edge 85 will be effective only to deflect the unresisting edge of the previously cut skin portion whereas the cutting edge 86, now alined with the line to be cut, is effective to cut along the desired line.

The translatory movement of the cutting element is produced by the cam 65 or 72 and the spring 62 acting in opposite directions against the horizontal arm 47 of the carriage to slide the arm in the guides 46. The arm 49 of the carriage slides between the guide brackets 61 and carries with it the cutting element reciprocating mechanism including the chuck 51 and the eccentric mechanism 56 to 59. The cam 65 moves the carriage rearwardly and spring 62 returns the carriage in an opposite direction.

As the carriage slides in and out, the pinion 60 will slide relative to the gear 19 without losing its mesh therewith.

The motion of the cutting element will be quite rapid compared to the motion of the carriage and rollers 35, and this difference in speeds is obtained by employing the worm 20 to step down the speed to the carriage reciprocating mechanism and advancing rollers and by employing the large gear 19 and small pinion 60 to step up the speed to the cutting element. By mounting both worm 20 and gear 19 on the same shaft, a constant ratio between the respective speeds of the carriage control mechanism and cutting element drive mechanism is assured.

The practice of my improved method or process of fur cutting enables the accomplishment of machine cutting of fur by piercing the same transversely of its plane with a series of narrow cuts, progressively arranged in the fur along the desired line of cut and conjointly forming a continuous line cut, the necessary relative movement of translation between the fur and the piercing device being slow as compared with the piercing movement.

It will be understood that the term "piercing" as used herein, refers to the making of a very short cut by a relatively long slender cutting element which moves in a direction along its own axis and transversely to the plane of the skin from an initial position wholly outside the plane of the skin through successive positions wherein its sharpened end first intersects said plane, thence passes through said plane, and thence withdraws from said plane, whether the leading extremity of said cutting instrument, in intersecting said plane, enters uncut skin or a previously made cut.

Machines embodying various specific forms of mechanisms may be utilized in the practice of my improved method or process of cutting fur without departing from the real spirit and purpose of my invention, and it is my intention to cover my improved method or process irrespective of the particular mechanisms used so long as the steps or acts or the series or combination of steps or acts defined in the appended claims are employed either manually or by use of such mechanisms.

I claim as my invention:

1. The method of cutting a fur bearing hide which comprises repeatedly piercing the hide progressively along the desired line of cut, the individual cuts being relatively narrow, and made between the hairs and each constituting a straight line continuation of another such cut whereby to provide a substantially straight line cut.

2. The method of notching a fur bearing hide which comprises repeatedly piercing the hide progressively along the desired line of cut, the individual cuts being relatively narrow, and made between the hairs and each constituting a straight line continuation of another such cut whereby to provide a substantially straight line cut.

3. The method of notching a fur bearing hide which comprises repeatedly piercing the hide from the flesh side progressively along the desired line of cut, the individual punctures being relatively narrow, and made between the hairs and each constituting a straight line continuation of another such cut whereby to provide a substantially straight line cut.

4. The method of cutting fur bearing hide which comprises repeatedly piercing the hide between the hairs thereof, and shifting the relative positions of the hide and piercing means so as to arrange the punctures progressively along the line of cut and each constituting a straight line continuation of another such cut whereby to provide a substantially straight line cut.

5. The method of notching a fur bearing hide which comprises imparting to the hide linear travel, repeatedly forming individual relatively narrow cuts in the hide in a manner for deflecting but not cutting the hairs thereof and while moving the cutting means back and forth in a line traversing the line of feed of the hide, the individual cuts and the combined hide and cutting means movement cooperating to form a continuous notched line cut in the hide, each said cut constituting a straight line continuation of another cut whereby said notched-line cut is composed of straight line portions.

6. The method of notching a fur bearing hide which comprises imparting to the hide slow linear travel, rapidly and repeatedly forming conjoint individual and relatively narrow cuts in the hide in a manner for deflecting but not cutting the hairs thereof and while moving the cutting means slowly back and forth in a line traversing the line of feed of the hide, each said cut constituting a straight line continuation of another cut whereby to provide a substantially straight line cut.

7. The method of notching a fur bearing hide which comprises rapidly reciprocating a narrow cutting element through the hide whereby to deflect but not cut the same while imparting linear feed to the hide and translatory movement to the reciprocating cutting element back and forth across the path of linear feed and in timed relation to said linear feed whereby the individual cuts will be caused to cooperate in forming a continuous notched-line cut in the hide, each said cut constituting a straight line continuation of another cut whereby said notched-line cut is composed of straight line portions.

8. The method of cutting a fur bearing hide which comprises repeatedly forming individual relatively narrow cuts in the hide progressively along the desired line of cut, the individual cuts conjointly forming a continuous line cut and each being made between hairs of the hide and each constituting a straight line continuation of another such cut whereby to provide a substantially straight line cut.

9. The method of cutting a fur bearing hide which comprises the forming in the hide of a continuous zig-zag or notched-line cut, each zig and each zag of the line cut being formed of a plurality of individual relatively narrow cuts initiated between the hairs of the hide whereby to deflect but not cut the same, each said cut constituting a straight line continuation of another cut whereby said notched-line cut is composed of straight line portions.

10. The method of cutting a fur bearing hide which comprises the forming in the hide of a continuous zig-zag or notched-line cut, the zigs and zags of the line cut being formed progressively and each by a succession of individual relatively narrow cuts initiated between the hairs of the hide whereby to deflect but not cut the same, each said cut constituting a straight line continuation of another cut whereby said notched-line cut is composed of straight line portions.

11. The method of cutting a fur bearing hide which comprises the forming in the hide of a continuous zig-zag or notched-line cut, the zigs and zags of the line cut being formed progressively and each by a succession of individual relatively narrow cuts entering the hide from the flesh side and deflecting, not cutting the hairs, each said cut constituting a straight line continuation of another cut whereby said notched-line cut is composed of straight line portions.

12. The method of cutting a fur bearing hide which comprises repeatedly piercing the hide with a very narrow cutting element whereby to deflect but not cut the hairs of the hide, continuously feeding the hide during the piercing thereof while at the same time imparting transverse translatory movement back and forth of said element in timed relation to the feeding movement to cause the resulting individual narrow cuts to conjointly form a continuous notched-line or zig-zag cut, each said cut constituting a straight line continuation of another cut whereby said notched-line cut is composed of straight line portions.

13. The method of notching a fur bearing hide which comprises imparting to the hide slow linear travel, rapidly and repeatedly forming conjoint individual and relatively narrow cuts in the hide in a manner for deflecting but not cutting the hairs thereof and while moving the cutting means slowly back and forth in a line traversing the line of feed of the hide and controlling the relative speeds of the linear travel and the back and forth movement to cause the edges defining the notches to be substantially straight.

14. The method of cutting a fur bearing hide which comprises repeatedly piercing the hide with a very narrow cutting element whereby to deflect but not cut the hairs of the hide, continuously feeding the hide during the piercing thereof while at the same time imparting transverse translatory movement back and forth of said element in timed relation to the feeding movement to cause the resulting individual narrow cuts to conjointly form a continuous notched-line or zig-zag cut and controlling the relative speeds of the feeding movement and the back and forth movement to cause each zig and zag of the zig-zag cut to comprise a substantially straight line.

15. The method of notching a fur bearing hide which comprises imparting to the hide slow linear travel, rapidly and repeatedly forming conjoint individual and relatively narrow cuts in the hide in a manner for deflecting but not cutting the hairs thereof and while moving the cutting means slowly back and forth in a line traversing the line of feed of the hide, each said cut constituting a straight line continuation of another cut whereby to provide a substantially straight line cut, and adjusting the degree of movement back and forth of said cutting means proportional to the speed of linear travel of the hide whereby to vary the size of the notches without varying the angles formed by the edges defining said notches or the straight line alinement of the individual cuts conjointly forming each notch defining edge.

OSCAR M. DEAN.